United States Patent
Chen et al.

(10) Patent No.: US 10,506,876 B1
(45) Date of Patent: Dec. 17, 2019

(54) SELF-ASSEMBLY CABINET

(71) Applicants: Kung-Cheng Chen, Taichung (TW); Lung-Chuan Huang, Taichung (TW)

(72) Inventors: Kung-Cheng Chen, Taichung (TW); Lung-Chuan Huang, Taichung (TW)

(73) Assignee: E-MAKE Co., Ltd., Taichung (TW)

( * ) Notice: Subject to any disclaimer, the term of this patent is extended or adjusted under 35 U.S.C. 154(b) by 0 days.

(21) Appl. No.: 15/884,873

(22) Filed: Jan. 31, 2018

(51) Int. Cl.
*A47B 47/04* (2006.01)
*F16B 12/14* (2006.01)
*A47B 55/00* (2006.01)
*F16B 5/06* (2006.01)

(52) U.S. Cl.
CPC ............ *A47B 47/047* (2013.01); *A47B 55/00* (2013.01); *F16B 5/0614* (2013.01); *F16B 12/14* (2013.01); *A47B 2210/0005* (2013.01); *F16B 2012/145* (2013.01)

(58) Field of Classification Search
CPC .............. A47B 47/047; A47B 47/0025; A47B 47/0066; A47B 47/0075; A47B 47/0091; A47B 47/0042; A47B 55/00; F16B 5/0614; F16B 12/10; F16B 2012/145; F16B 2012/2018
See application file for complete search history.

(56) References Cited

U.S. PATENT DOCUMENTS

| | | | | |
|---|---|---|---|---|
| 4,131,376 A * | 12/1978 | Busse | ................ | F16B 12/2036 312/263 |
| 4,669,910 A * | 6/1987 | Koch | ................ | F16B 12/2036 403/231 |
| 2008/0042532 A1 * | 2/2008 | Crabtree | ............... | A47B 47/042 312/257.1 |
| 2010/0008744 A1 * | 1/2010 | Tseng | ................ | A47B 47/0075 411/166 |
| 2011/0241510 A1 * | 10/2011 | Lin | .................... | A47B 47/0066 312/309 |
| 2011/0290750 A1 * | 12/2011 | Lim | ....................... | A47B 47/00 211/153 |
| 2012/0321378 A1 * | 12/2012 | Velez, Jr. | ................ | F16B 12/20 403/300 |
| 2015/0129728 A1 * | 5/2015 | Tandjung | .............. | F16B 5/0614 248/205.4 |
| 2016/0258461 A1 * | 9/2016 | Muller | ................... | A47D 1/006 |
| 2016/0265218 A1 * | 9/2016 | Gosling | .................. | E04B 2/721 |
| 2016/0296014 A1 * | 10/2016 | O'Connell, Jr. | ....... | A47B 85/00 |
| 2017/0074307 A1 * | 3/2017 | Slagle | ..................... | F16B 12/20 |
| 2017/0079426 A1 * | 3/2017 | Davis | ................. | B65D 21/0212 |
| 2017/0321734 A1 * | 11/2017 | Maertens | ................ | F16B 12/12 |
| 2018/0092460 A1 * | 4/2018 | Stack | .................... | A47B 47/042 |
| 2018/0184802 A1 * | 7/2018 | Lin | ..................... | A47B 47/0075 |

* cited by examiner

*Primary Examiner* — Daniel J Rohrhoff

(57) ABSTRACT

A self-assembly cabinet includes a box including a rectangular front frame, a rectangular rear frame, two rectangular side frames interconnecting the front frame and the rear frame, a top frame on tops of the front frame, the rear frame, and the side frames, and a bottom frame on bottoms of the front frame, the rear frame, and the side frames; a plurality of latches secured to four corners of an inner surface of each side frame respectively; and a plurality of cooperating fastening structures secured to four corners of an inner surface of each of the front frame and the rear frame respectively. The latches are releasably secured to the cooperating fastening structures respectively so that the side frames, the front frame, and the rear frame are assembled.

6 Claims, 8 Drawing Sheets

SELF-ASSEMBLY CABINET

BACKGROUND OF THE INVENTION

1. Field of the Invention

The invention relates to cabinets and more particularly to a self-assembly cabinet having a plurality of latches and cooperating fastening structures releasably fastened together.

2. Description of Related Art

Self-assembly furniture (e.g., cabinet) is popular among consumers in recent decades. This is because it is easy to disassemble. Typically, a self-assembly cabinet is assembled by using screws, adhesives and/or dovetail joints. A person has to hold two adjacent components while joining them by above means. However, the components may fall or incline or a precise assembly is not possible due to shake and/or the weights of the components. And in turn, it causes a proper use of the cabinet to be impossible.

Thus, the need for improvement still exists.

SUMMARY OF THE INVENTION

It is therefore one object of the invention to provide a self-assembly cabinet comprising a box including a rectangular front frame, a rectangular rear frame, two rectangular side frames interconnecting the front frame and the rear frame, a top frame on tops of the front frame, the rear frame, and the side frames, and a bottom frame on bottoms of the front frame, the rear frame, and the side frames; a plurality of latches secured to four corners of an inner surface of each side frame respectively; and a plurality of cooperating fastening structures secured to four corners of an inner surface of each of the front frame and the rear frame respectively; wherein the latches are releasably secured to the cooperating fastening structures respectively so that the side frames, the front frame, and the rear frame are assembled.

The above and other objects, features and advantages of the invention will become apparent from the following detailed description taken with the accompanying drawings.

DETAILED DESCRIPTION OF THE INVENTION

Figure 1:
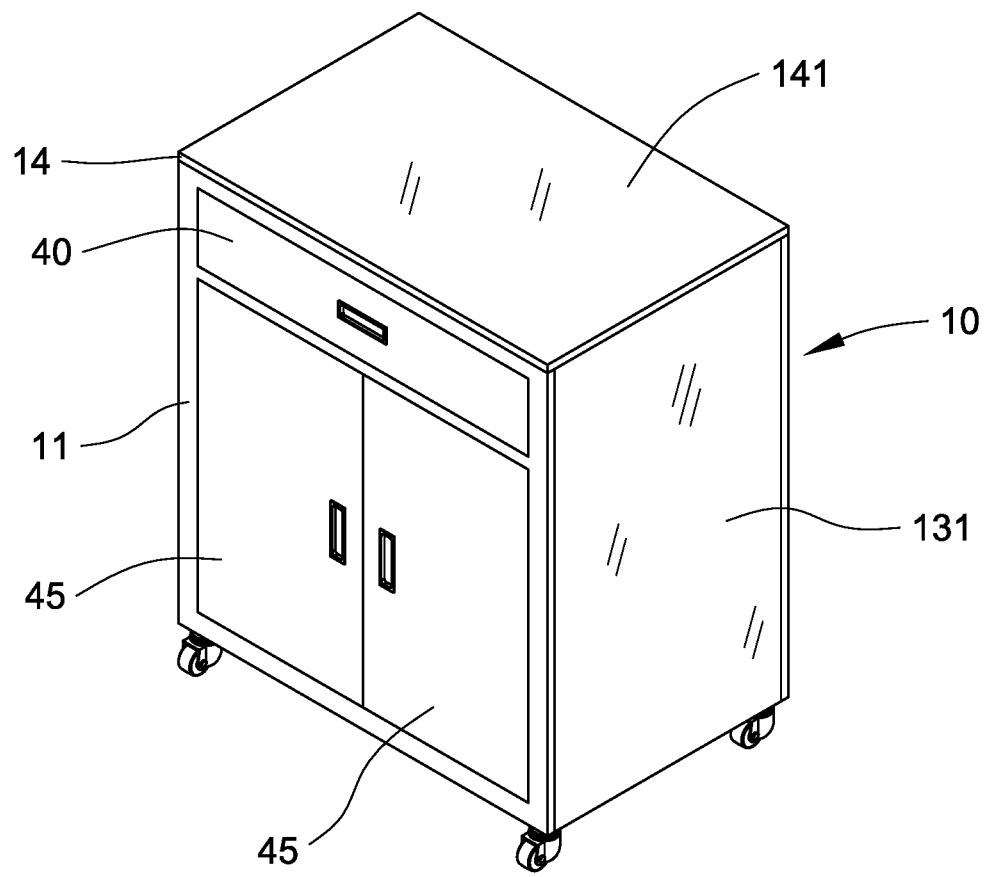
FIG. 1 is a perspective view of a self-assembly cabinet according to a first preferred embodiment of the invention.
Figure 2:
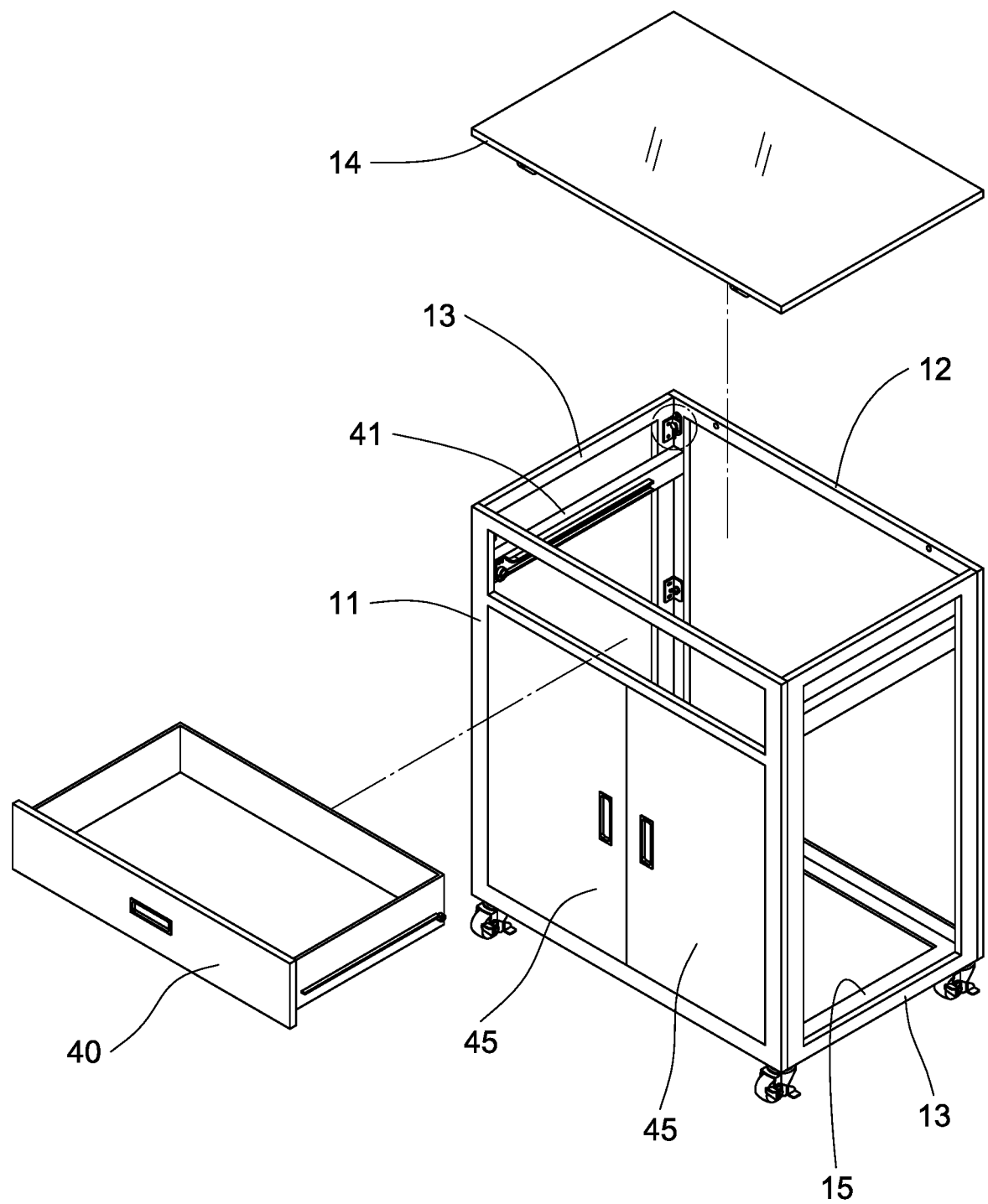
FIG. 2 is an exploded perspective view of the self-assembly cabinet.
Figure 3:
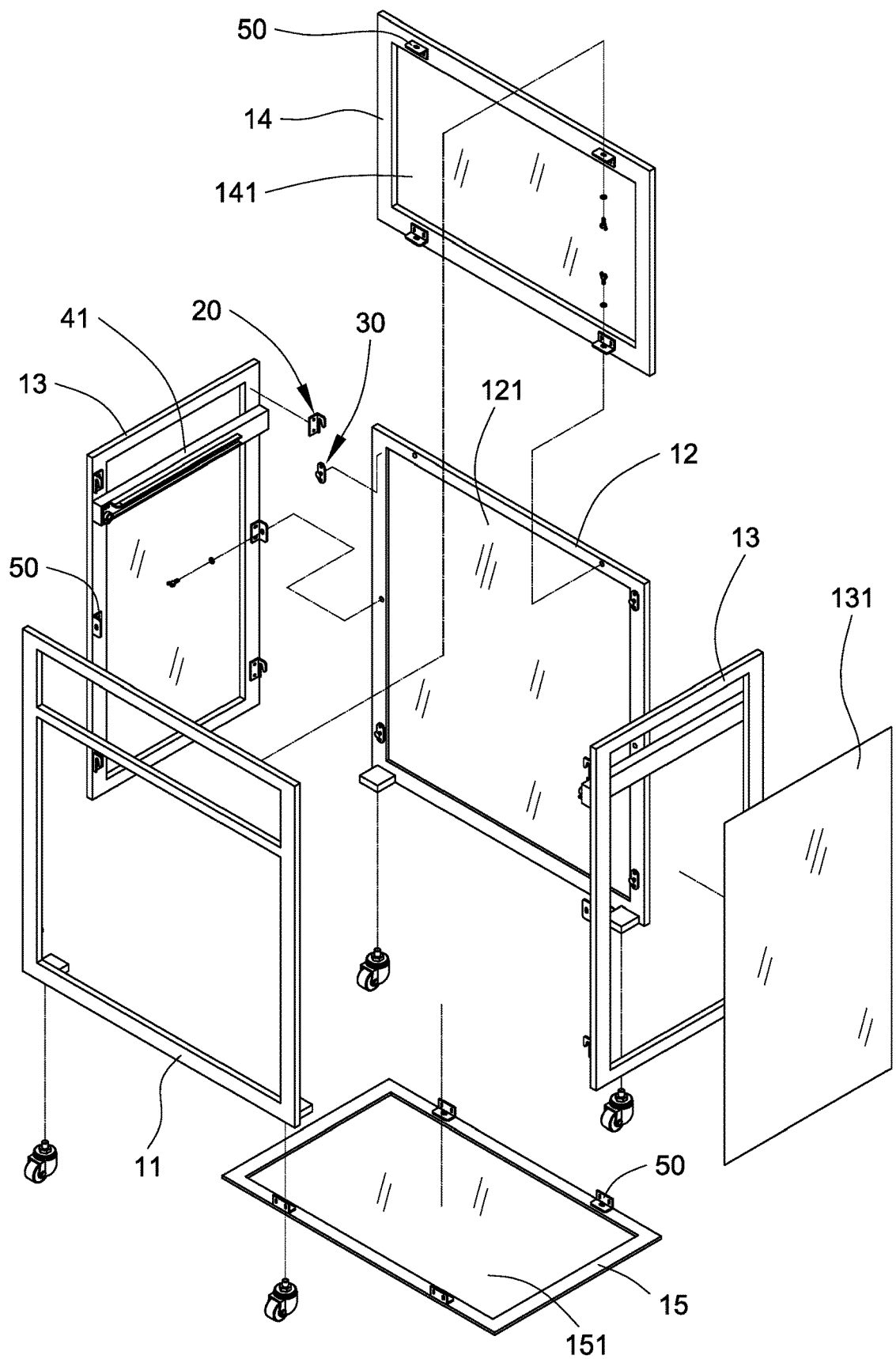
FIG. 3 is an exploded view of the self-assembly cabinet without the doors and the drawer.

Referring to FIGS. 1 to 8, a self-assembly cabinet in accordance with a first preferred embodiment of the invention comprises a box 10, a plurality of latches 20, a plurality of cooperating fastening structures 30, a drawer 40, a pair of front doors 45, and a plurality of 90-degree bent members 50 as discussed in detail below.

The box 10 comprises a rectangular front frame 11, a rectangular rear frame 12, two rectangular side frames 13 interconnecting the front frame 11 and the rear frame 12, a top frame 14 on tops of the front frame 11, the rear frame 12, and the side frames 13, and a bottom frame 15 on bottoms of the front frame 11, the rear frame 12, and the side frames 13.

The box 10 further comprises a rear plate 121 secured to the rear frame 12, two side plates 131 secured to the side frames 13 respectively, a top plate 141 secured to top of the top frame 14, and a bottom plate 151 secured to bottom of the bottom frame 15. That is, top, bottom and two sides of the box 10 each have a plate secured thereto.

The latches 20 are secured to four corners of an inner surface of each side frame 13 respectively. The cooperating fastening structures 30 are secured to four corners of an inner surface of each of the front frame 11 and the rear frame 12 respectively (see FIGS. 2 to 6). The latch 20 is temporarily secured to the cooperating fastening structure 30.

The drawer 40 includes two slides 41 each provided on an inner surface of the side frame 13 so that the drawer 40 may be pushed in or pull out relative to the side frames 13. The doors 45 are hingedly secured to two sides of the front frame 11 respectively.

The 90-degree bent members 50 are provided on inner surfaces of the top frame 14, the side frames 13, and the bottom frame 15 respectively. Further, screws are used to secure the top frame 14, the side frames 13, the bottom frame 15, the front frame 11 and the rear frame 12 together.

Figure 4:
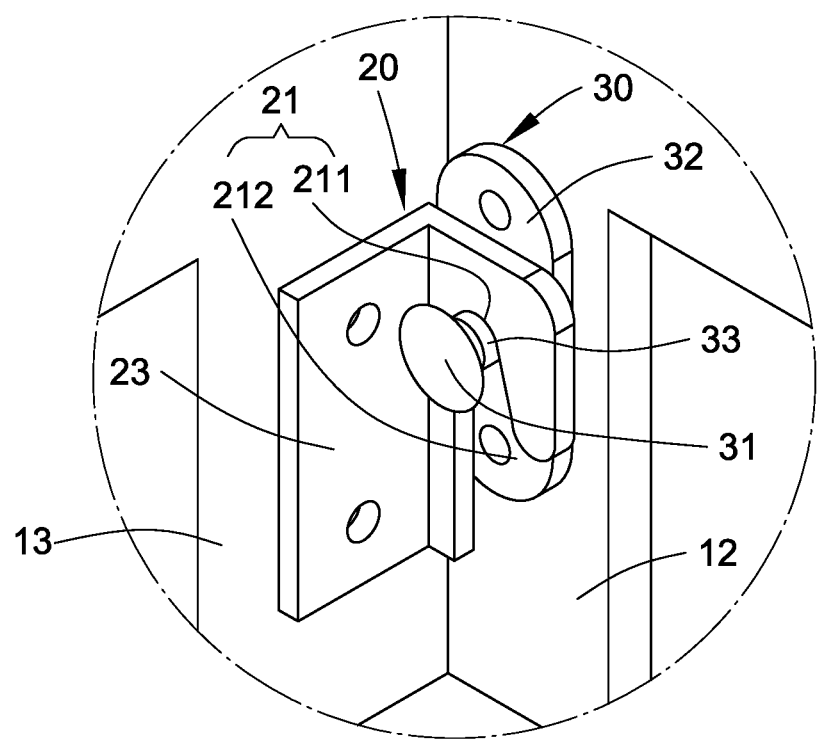
FIG. 4 is an enlarged perspective view showing the fastening of the latch and the cooperating fastening structure.
Figure 5:
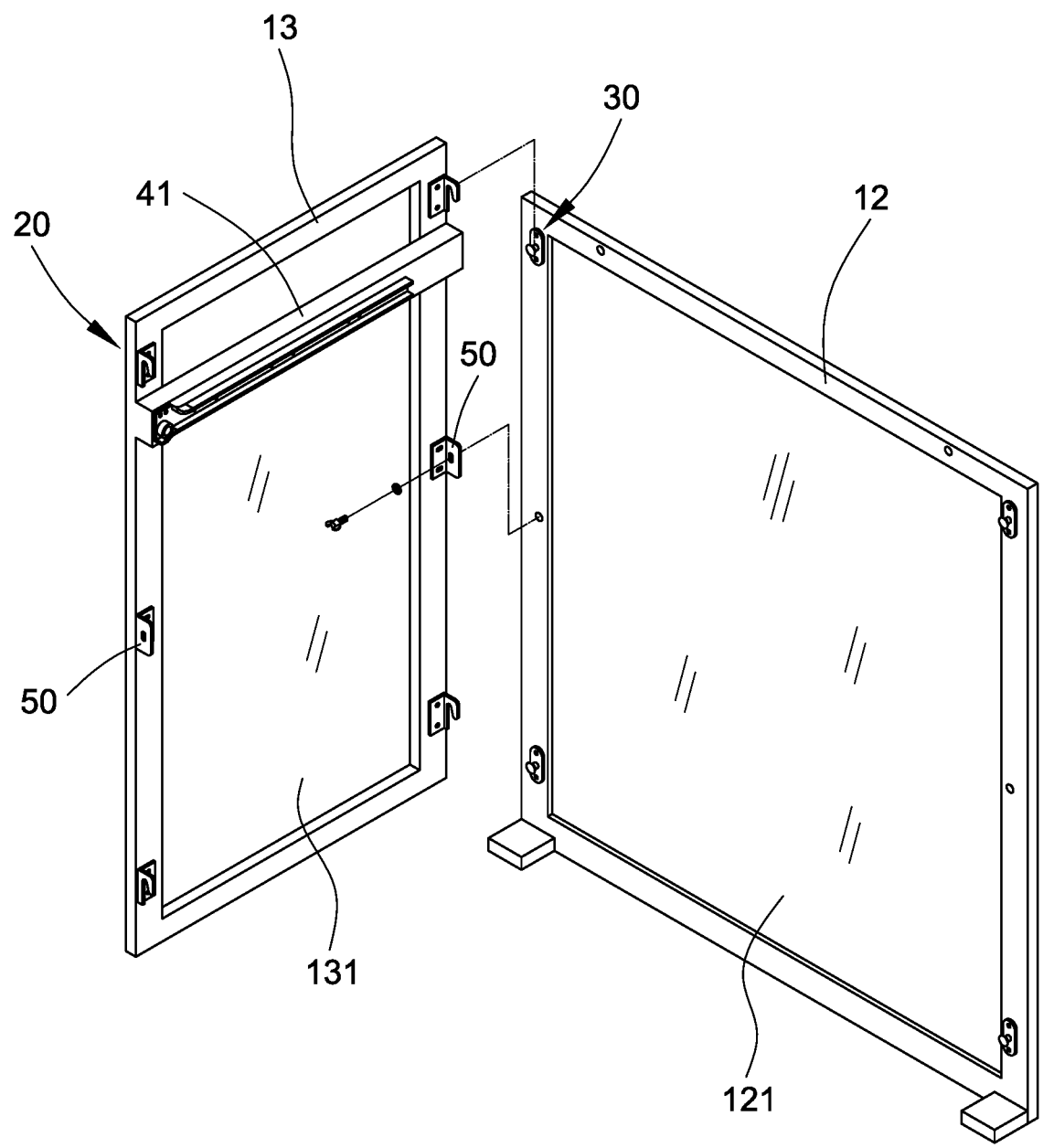
FIG. 5 is a perspective view showing the side frame to be secured to the rear frame by driving a screw through the 90-degree bent member on the side frame into the rear frame, and releasably fastening the latch and the cooperating fastening structure together.
Figure 6:
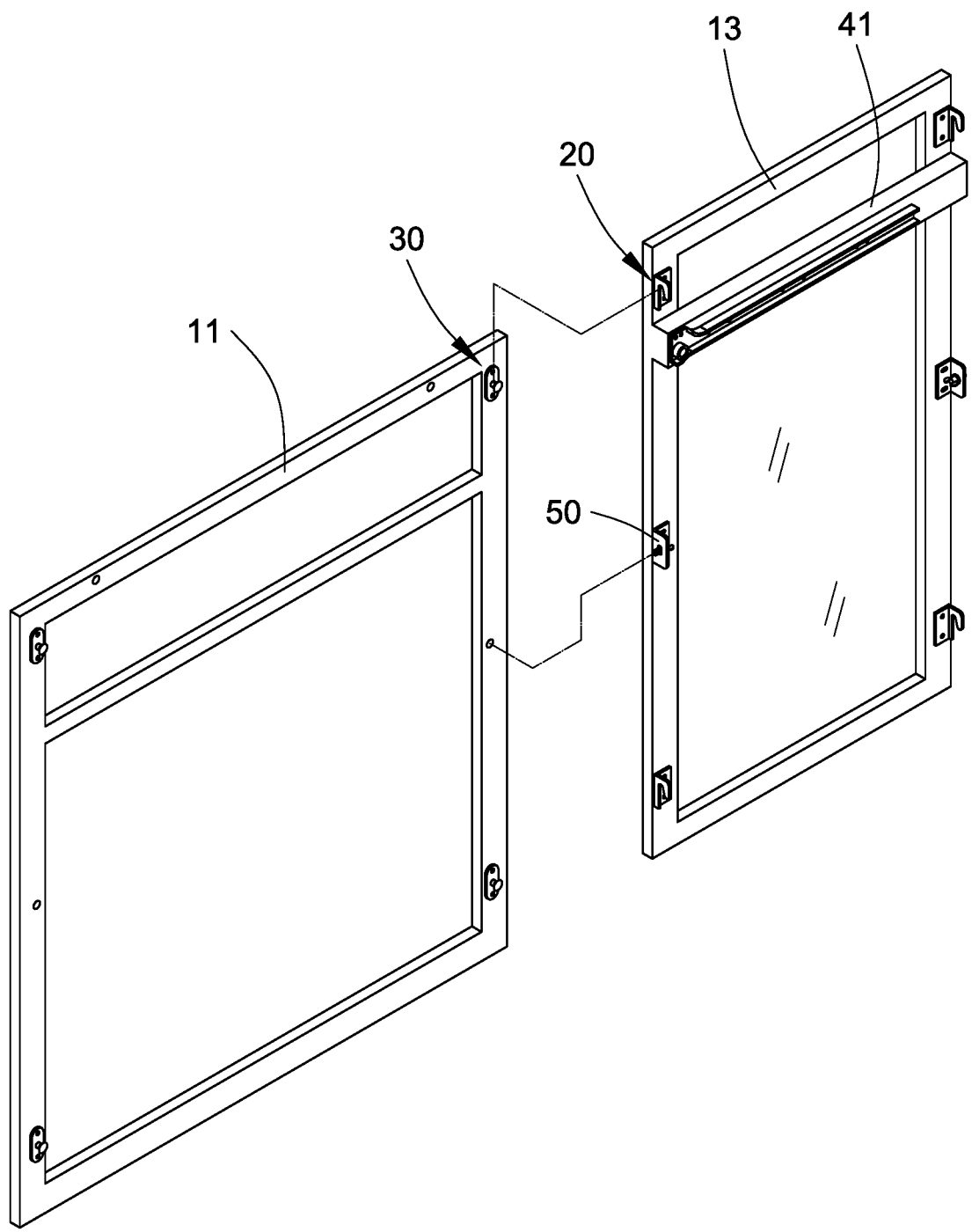
FIG. 6 is a perspective view showing the side frame to be secured to the front frame by driving a screw through the 90-degree bent member on the side frame into the front frame, and releasably fastening the latch and the cooperating fastening structure together.
Figure 7:
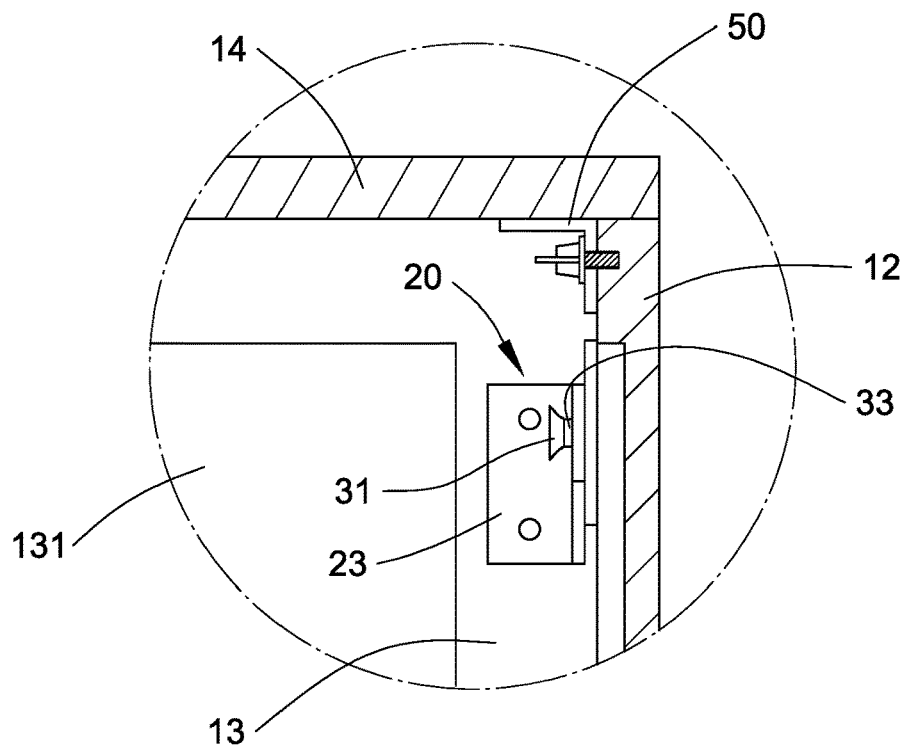
FIG. 7 is an enlarged longitudinal sectional view showing a fastening of the side frame, the rear frame and the top frame.
Figure 8:
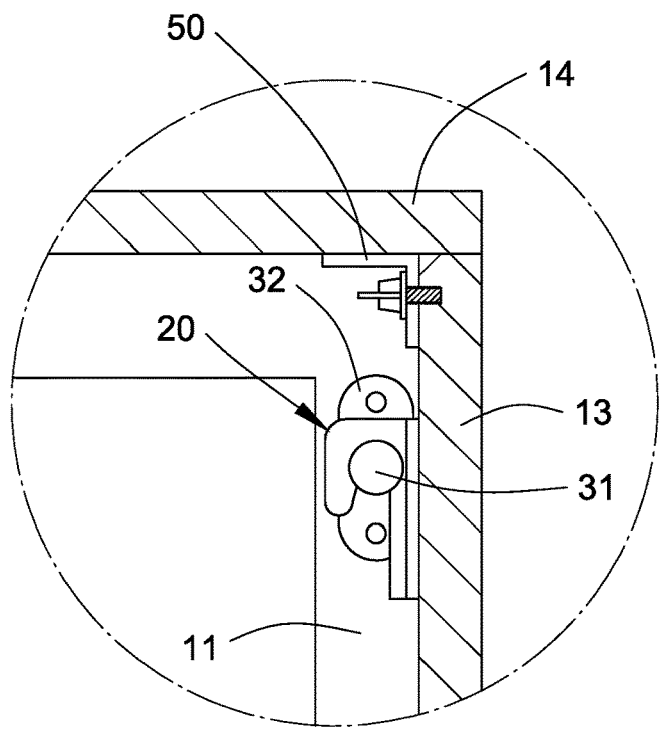
FIG. 8 is an enlarged longitudinal sectional view showing a fastening of the side frame, the front frame and the top frame.

As shown in FIG. 4, the latch 20 includes an extension 21 having a concave member 211 and a hook 212 at an open end; and a rectangular plate member 23 at an angle of 90-degree with respect to the extension 21 and threadedly secured to the side frame 13. The cooperating fastening structure 30 includes a plate element 32 threadedly secured to the rear frame 12 or the front frame 11, a cylindrical member 33 projecting out of the plate element 32, and an enlargement 31 at an open end of the cylindrical member 33. The concave member 211 is put on the cylindrical member 33 and the enlargement 31 is used to prevent the concave member 211 from being disengaged from the cylindrical member 33. The size of the concave member 211 is about the same as a diameter of the cylindrical member 33 and a diameter of the enlargement 31 is greater than the size of the concave member 211. This enables an easy assembly or disassembly of the box 10.

As shown in FIGS. 5 to 8 specifically, the latches 20 on the side frame 13 are secured to the cooperating fastening structures 30 on the front frame 11 and the rear frame 12 respectively. Thus, the front frame 11, the side frames 13 and the rear frame are joined. Further, two first screws are driven through the 90-degree bent members 50 on the side frame 13 into the rear frame 12, two second screws are driven through the 90-degree bent members 50 on the side frame 13 into the front frame 11, four third screws are driven through the 90-degree bent members 50 on the top frame 14 into the rear frame 12 and the front frame 11 respectively, and four fourth screws are driven through the 90-degree bent members 50 on the bottom frame 15 into the rear frame 12 and the front frame 11 respectively. As a result, the box 10 except the doors 45 is assembled. Optionally, four wheels (not numbered) are mounted on two ends of a bottom of the front frame 11 and two ends of a bottom of the rear frame 12 respectively.

Figure 9:
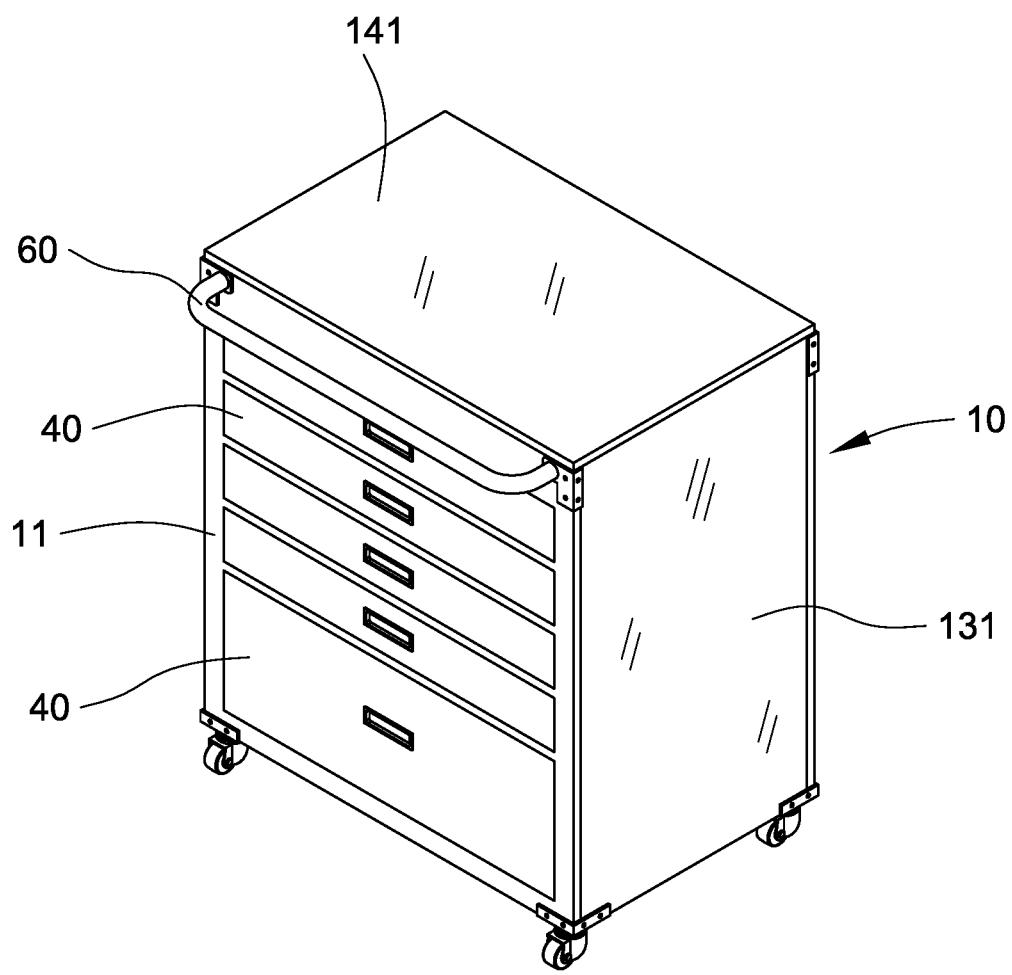
FIG. 9 is a perspective view of a self-assembly cabinet according to a second preferred embodiment of the invention.

Referring to FIG. 9, a self-assembly cabinet in accordance with a second preferred embodiment of the invention is shown. The characteristics of the second preferred embodiment are substantially the same as that of the first preferred embodiment except the following: a plurality of drawers 40 are provided and a handle 60 is secured to two ends of a top of the front frame 11.

It is envisaged by the invention that a quick and easy assembly or disassembly of the cabinet by using the latches 20 and the cooperating fastening structures 30 is made possible. Further, the components are precisely joined.

While the invention has been described in terms of preferred embodiments, those skilled in the art will recognize that the invention can be practiced with modifications within the spirit and scope of the appended claims.

What is claimed is:

1. A self-assembly cabinet comprising:
    a box including a rectangular front frame, a rectangular rear frame, two rectangular side frames interconnecting the front frame and the rear frame, a top frame on tops of the front frame, the rear frame, and the side frames, and a bottom frame on bottoms of the front frame, the rear frame, and the side frames;
    a plurality of latches secured to four corners of an inner surface of each side frame respectively; and
    a plurality of cooperating fastening structures secured to four corners of an inner surface of each of the front frame and the rear frame respectively;
    wherein the latches are releasably secured to the cooperating fastening structures respectively so that the side frames, the front frame, and the rear frame are configured to assemble;
    wherein each latch includes an extension having a concave member and a hook at an open end, and a plate member being at an angle of 90-degree with respect to the extension and threadedly secured to the side frame;
    wherein each cooperating fastening structure includes a plate element threadedly secured to the rear frame or the front frame, a cylindrical member projecting out of the plate element, and an enlargement at an open end of the cylindrical member; and wherein the concave member is put on the cylindrical member and the enlargement is configured to prevent the concave member from being disengaged from the cylindrical member.

2. The self-assembly cabinet of claim 1, further comprising at least one drawer each including two slides each provided on an inner surface of the side frame so that the drawer is configured to push in or pull out relative to the side frames.

3. The self-assembly cabinet of claim 1, further comprising two doors hingedly secured to two sides of the front frame respectively.

4. The self-assembly cabinet of claim 1, wherein size of the concave member is about the same as a diameter of the cylindrical member and a diameter of the enlargement is greater than the size of the concave member.

5. The self-assembly cabinet of claim 1, further comprising a plurality of 90-degree bent members threadedly secured to inner surfaces of the top frame, the side frames, and the bottom frame respectively.

6. The self-assembly cabinet of claim 1, further comprising a plurality of plates secured to the rear frame, the top frame, the bottom frame, and the side frames respectively.

\* \* \* \* \*